June 22, 1965  B. A. SHOTTER  3,189,977
PRODUCTION OF TOOTHED GEARING
Filed June 3, 1963
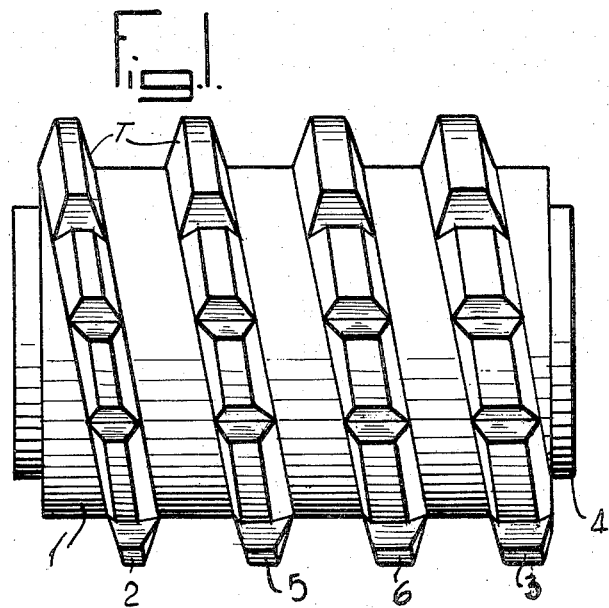
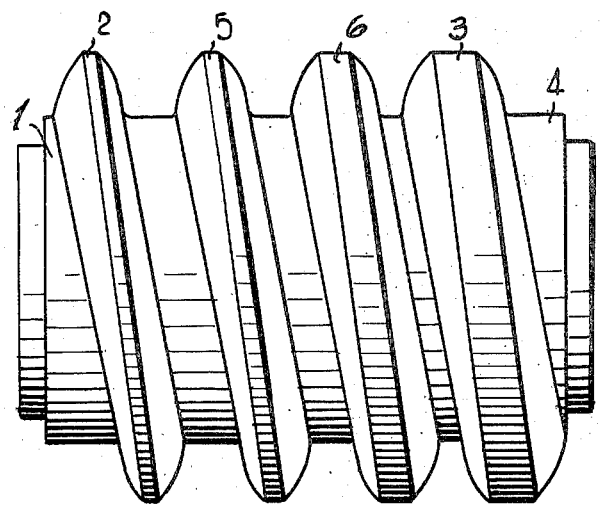

3,189,977
PRODUCTION OF TOOTHED GEARING
Brian Alfred Shotter, Rugby, England, assignor to Associated Electrical Industries Limited, London, England, a British company
Filed June 3, 1963, Ser. No. 285,063
Claims priority, application Great Britain, June 6, 1962, 21,899
1 Claim. (Cl. 29—103)

This invention relates to hobs for the production of parallel axis toothed gearing. The hobs with which the invention is concerned are suitable for two basic purposes. One is to control, within a predetermined range, the degree of backlash between intermeshing gears of the kind employing teeth the flanks of which are curved in the form of circular arcs, as opposed to the customary involute type. The other is in the production of teeth of the crowned type, that is to say teeth the thickness of which is less at the ends, than at the middle, of the teeth. Crowned teeth may be adopted in cases in which some lack of parallelism in the axes of intermeshing gears is to be allowed for. Crowned teeth may be required in gearing of the kind employing involute teeth as well as in those the flanks of which are curved in the form of circular arcs.

The hobs normally used for cutting toothed gears are basically worm gears, the teeth of which have been gashed to produce cutting edges. In cutting involute teeth, clearance or backlash in the teeth of the gear being cut can be adjusted by modifying the cutting depth of the hob. It is because the profile of the teeth on the hob has straight flanks that by this method the size of the teeth on the gear can be modified without affecting the form of the profile.

A hob for cutting gears of the kind employing a tooth profile in the form of circular arcs, also known as Wildhaber-Novikov gears, is required to have a tooth profile with curved flanks and, in order to produce the correct profile in the flanks of the teeth being cut, it is necessary for the centre of curvature of those flanks to lie on the pitch-circle of the gear. It is therefore, not permissible to alter the cutting depth of the hob in order to regulate the degree of clearance or backlash in the gear.

A hob can be designed to produce, in a Wildhaber-Novikov gear, a given amount of backlash, but a plurality of hobs would then be required to produce gears having different amounts of backlash even though the tooth profile remained constant.

The object of the present invention is to provide a hob for cutting crowned gear teeth, either of the normal involute type, or of the Wildhaber-Novikov type, and which also enables a selected degree of backlash within a given range to be produced in the gear.

The invention consists in a hob for cutting gear teeth, in which the axial thickness of the teeth of the hob at a constant radius from the axis of the hob varies axially of the hob uniformly from one end of the hob to the other.

With such a hob, the amount of backlash in the gear can be determined by the design of the hob and by the axial position of the centre of the hob relative to the axis of rotation of the gear being cut. If the axial position of the hob is varied, during cutting, crowned teeth are also obtainable.

In any normal worm gear the axial pitch of the tooth helix is constant and is the same for both flanks. It is possible, however, for the two flanks to be ground separately and for the lead angle of one flank of the tooth to be made slightly different from that of the other flank. This principle is already known in connection with a "duo-lead" worm, but it will be evident that by the application of this principle to a hob for cutting gears of the Wildhaber-Novikov type the varying tooth thickness so obtained can be utilised to adjust the amount of backlash in the gear.

In order that the invention may be more readily understood an embodiment thereof will now be described with reference to FIGS. 1 and 2 of the accompanying drawing which illustrate the hob in accordance with the invention for cutting gears of the involute and Wildhaber-Novikov form respectively.

Referring now to the drawings we show in FIGURE 1 and FIGURE 2 hobs adapted to cut gear teeth of the involute and Wildhaber-Novikov form respectively and in which, in accordance with the present invention, the amount of backlash in the gears is reduced. For the sake of clarity, the teeth of the hob have been drawn as a continuous helix, in both diagrams, the teeth T at the left hand side 1 of the hob have an axial thickness 2 considerably less than the axial thickness 3 of those teeth at the right hand side 4 of the hob, the tooth thickness 5 and 6 having a thickness uniformly changing between the teeth 2 and 3.

Whilst the variation in tooth thickness in the drawing has been shown as quite large it is to be understood that in practice the change in tooth thickness is likely to be much less than that indicated in the diagrams; the variation in tooth thickness would clearly be related to the particular application for which gears cut by the hobs were intended and can be clearly adapted by one skilled in the art to account for variation in gear design parameters.

As an example a knob of some 5 inches in length could have the tooth thickness at one end 0.005 inch narrower than those teeth at the other end of the hob. Axial displacement of the hob relative to the gear being cut would change the amount of backlash by approximately 0.001 inch per inch displacement.

What I claim is:

A gear cutting hob for the production of parallel axis toothed gears, comprising a central shaft portion, an outer cutter thread portion progressing helically along the longitudinal axis of the hob, the thread portion having a constant pitch and flank profile and at a given radius from the axis, having an axial thickness which increases continuously from one end of the hob to the other.

References Cited by the Examiner
UNITED STATES PATENTS
1,596,912  8/26  Wildhaber.
2,468,745  5/49  Garand _____ 29—95.1
2,511,964  6/50  Boor.

FOREIGN PATENTS
33,700  7/08  Austria.

WILLIAM W. DYER, Jr., *Primary Examiner.*